June 15, 1937.  G. ANGST  2,084,178
DOUBLE SPEED SYNCHRONOUS MOTOR
Filed Oct. 7, 1936  2 Sheets-Sheet 1
Fig. 1.
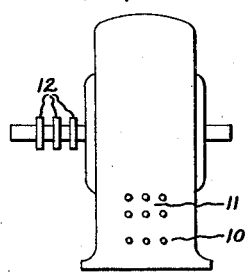
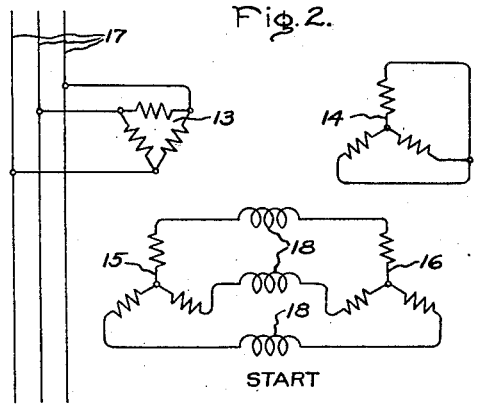
START
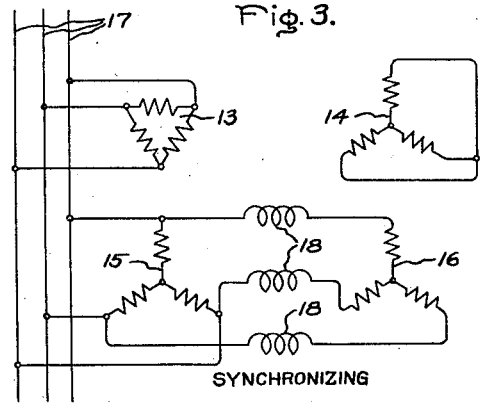
SYNCHRONIZING
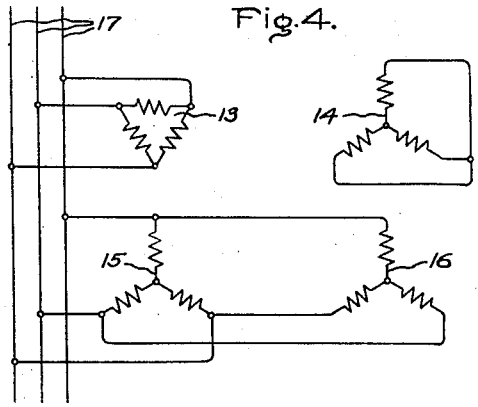
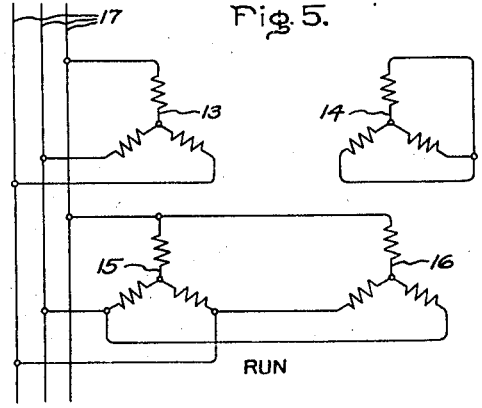
RUN
Inventor:
Gustave Angst,
by Harry E. Dunham
His Attorney.

June 15, 1937.  G. ANGST  2,084,178
DOUBLE SPEED SYNCHRONOUS MOTOR
Filed Oct. 7, 1936   2 Sheets-Sheet 2

Inventor:
Gustave Angst,
by Harry E. Dunham
His Attorney.

Patented June 15, 1937

2,084,178

UNITED STATES PATENT OFFICE 2,084,178

DOUBLE-SPEED SYNCHRONOUS MOTOR

Gustave Angst, Lynn, Mass., assignor to General Electric Company, a corporation of New York Application October 7, 1936, Serial No. 104,477

8 Claims. (Cl. 172—274)

My invention relates to synchronous motors of the type in which both the rotor and stator are provided with alternating-current windings and which, for synchronous operation, are excited with reversed phase rotation to obtain a synchronous speed equal to the sum of the speeds of the reversely rotating magnetic fields.

The object of my invention is to provide a motor of this type having effective and reliable starting and synchronizing characteristics and stable running characteristics, at the same time keeping the construction simple and the cost reasonable.

In carrying my invention into effect, I provide, in addition to the two primary alternating-current running windings, winding provisions for starting the motor as an induction motor of half the pole number of the primary windings. This half pole number induction motor winding provision is also utilized during synchronous operation as an effective stabilizing damper for the motor to prevent the motor from pulling out of step due, for instance, to changes in line frequency. Double synchronous speed motors as a class are very unstable and their usefulness may be greatly increased by effective damping means that resists any tendency to fall out of step. The half pole number induction motor winding provision may comprise an additional set of windings on stator and rotor or one of the main primary windings may be so connected as to serve simultaneously as a primary winding of one pole number and as an induction motor secondary winding of half such pole number.

Another important feature of my invention concerns the synchronizing of the motor as will be explained hereinafter.

Figure 6:
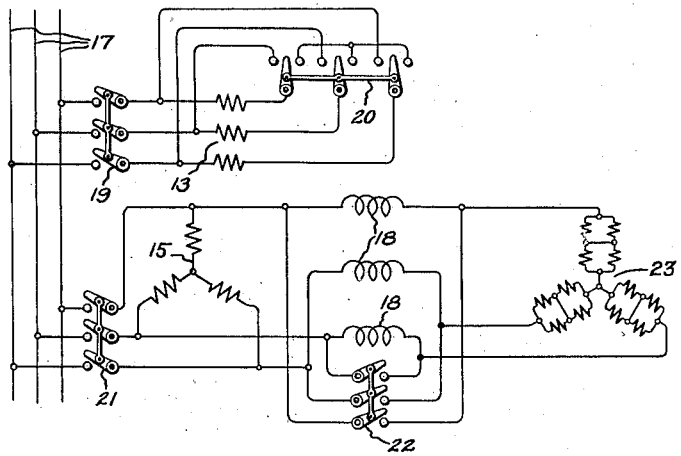
Figure 7:
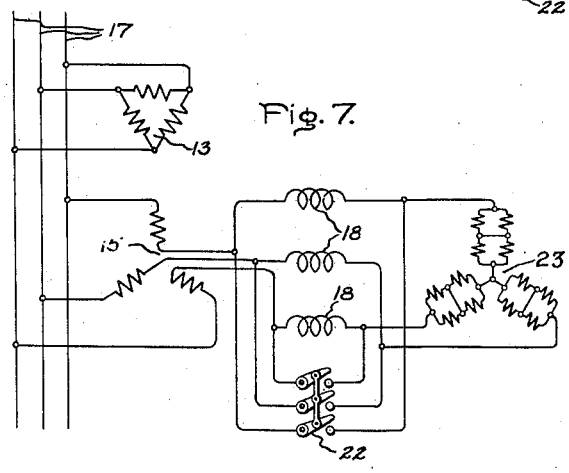
Figure 10:
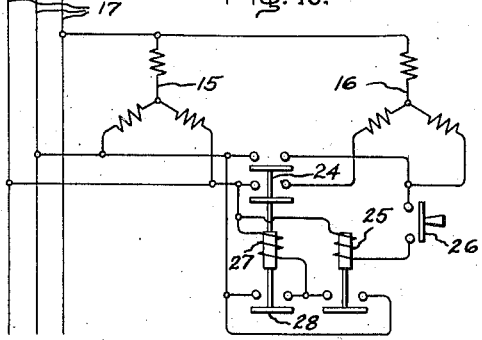

The features of my invention which are believed to be novel and patentable will be pointed out in the claims appended hereto. For a better understanding of my invention, reference is made in the following description to the accompanying drawings in which Fig. 1 represents the general external appearance of the motor with bearing pedestals omitted; Figs. 2 to 5, inclusive, represent different connections of the stator and rotor windings between starting and running conditions; Fig. 6 illustrates a switching arrangement that may be used; in both Figs. 6 and 7, a form of rotor winding is represented that may serve the double purpose of a primary winding of one pole number and an induction motor secondary winding of one-half such pole number; also Figs. 6 and 7 illustrate a novel use of reactance for the synchronizing operation which is explained in connection with the torque curves of Figs. 8 and 9; and Fig. 10 illustrates a conventional form of synchronizing arrangement.

The motor to which my invention relates is provided with main alternating-current exciting windings on both the rotor and stator, which are energized with reversed phase rotation for synchronous operation. Such a motor, therefore, has a synchronous speed of double that of the ordinary synchronous motor for the same pole number and frequency. For example, a four-pole double-speed synchronous motor has a speed of 3600 revolutions per minute on 60 cycles. The external appearance of such a motor is in general the same as an ordinary motor as shown in Fig. 1. One member, preferably the stator, has two sets of primary windings with the necessary leads brought out. In Fig. 1, 10 may represent leads to a three-phase four-pole primary winding and 11 leads from both ends of the three phases of a three-phase two-pole primary winding. Slip rings 12 are provided for connection to a three-phase primary rotor winding.

Figs. 2 to 5, inclusive, represent different possible connections of the motor between starting and running conditions. The windings shown at the left in these figures represent the stator windings and those shown at the right the rotor windings. The upper set of windings in each case represents the two-pole induction motor windings and those at the bottom in each figure the four-pole synchronous running windings. Fig. 2 represents the starting connections. Thus, 13 represents a two-pole three-phase stator primary winding connected in delta to the three-phase source of supply 17. The two-pole winding 14 on the rotor is short-circuited so that the motor starts and approaches two-pole synchronous speed. At start, resistance may be connected in this form of rotor starting winding, if necessary or desirable, and the resistance cut out as the motor comes up to speed. In any event, the induction motor starting arrangement will be designed to bring the motor up to approximately two-pole synchronous speed, i. e., low slip. During the starting operation, the main three-phase primary windings 15 and 16 on stator and rotor are not energized, although they may be connected in series or in parallel with reversed phase rotation as shown in Fig. 2. 18 represents the reactance which may be used in the synchronizing operation as will be described later.

In Fig. 3, the motor has been brought up to the two-pole induction motor speed and the main primary windings 15 and 16 connected to the source 17 to establish synchronous operation. During this operation, the induction motor winding 13 remains energized. I have found that, by using a suitable value of inductance 18, as shown, synchronous operation may be established by connecting the main primary windings to the line at any displacement angle between the rotating magnetic fields produced by the windings 15 and 16, if the load which the motor is required to pull into step is small.

After synchronous operation has been established, the inductance 18 may be short-circuited and the main primary windings 15 and 16 both connected directly to the source 17, as shown in Fig. 4. For normal synchronous operation, the induction motor remains energized to provide a damping action although, in most cases, the induction motor excitation may be reduced by changing the connection of its primary winding 13 from delta to star, as shown in Fig. 5.

Double-speed synchronous motors are very sensitive to disturbances, such as changes in line frequency which may pull the motor out of step, because an increase in frequency increases the speed of rotation of the rotating magnetic field of both windings 15 and 16 and the resultant change in relative speed is accumulative. The induction motor winding of half the pole number resists any change in speed from synchronism because it is also subject to the same change in frequency of source 17 and any departure from synchronous speed produces induction motor or induction generator action which resists the change. I have thus found that the starting induction motor may advantageously remain energized and be used as a damper for effectively cushioning such disturbances as would in many cases pull the motor out of step. Except as such disturbances occur, there is no load on the induction motor during synchronous operation because its average slip is zero. The loss incident to keeping the induction motor energized is that corresponding to no-load excitation and, in most cases, this may be reduced and still provide sufficient damping by changing winding 13 from delta to star.

Fig. 6 shows one possible switching arrangement for producing the change in connections depicted in Figs. 2 to 5, inclusive. 19 is a line switch for the two-pole auxiliary stator induction motor primary winding 13. 20 is a two-way switch which, when thrown to the right, connects the auxiliary winding 13 in star, and, when thrown to the left, connects the auxiliary winding in delta. In some cases, it may be feasible to dispense with line switch 19 since it will be evident that, with switch 19 closed, winding 13 may be deenergized by moving switch 20 to the open position shown. Switch 21 is the line switch for energizing the main primary four-pole windings of the motor and 22 is a switch for short-circuiting the synchronizing inductance 18. It will be understood that the switching arrangement may be modified as conditions warrant.

In Fig. 6 and also in Fig. 7, the two-rotor windings previously mentioned are combined in a single winding 23. The two-circuit star-connected four-pole three-phase winding with cross connections 23 shown provides short-circuit paths in which induction motor secondary currents induced by the two-pole winding 13 may flow to produce effective induction motor action. This two-pole short-circuit induction-motor is non-inductive to the four-pole field of the machine and is the equivalent of the separate windings 14 and 16 of Fig. 2 which are also non-inductive with respect to each other.

Fig. 7 shows the main primary windings on stator and rotor connected in series with each other instead of in parallel for synchronous operation. The synchronizing reactance 18 may effectively be used with either the parallel or series connection of the main primary windings. In the parallel connection, the reactance may be inserted in either the stator or rotor connection and, in the series connection, it may be inserted at any point in the series connection.

Figure 8:
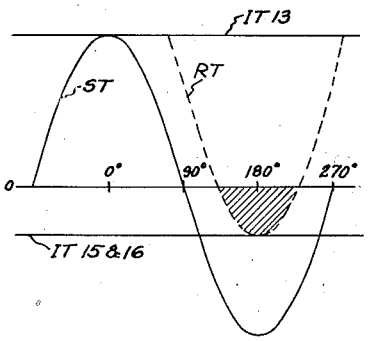
Figure 9:
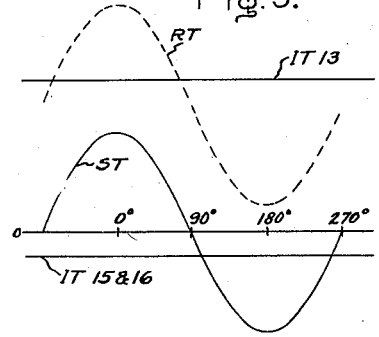

I will now explain with the help of the curves of Figs. 8 and 9 how the use of the inductance 18 assists the synchronizing action. These curves do not necessarily represent actual torque values but will serve to explain the change in torque relationship which the use of the inductance 18 brings about in the synchronizing operation. In Fig. 8, it is assumed that the motor has been brought up to the maximum speed obtainable by induction motor action with the two-pole winding 13 and is operating at constant speed with low slip, that the motor has not as yet been synchronized but that the four-pole windings 15 and 16 have been properly connected to line 17 without the inductance 18. Fig. 4 may represent the connections for the torque relations represented in Fig. 8 when the two-pole induction motor is operating at low slip and synchronization has not as yet been established. At this time, we may represent the two pole induction motor torque by the line IT13. It is constant and positive and is, therefore, represented above the zero torque line 0. The curve ST represents the synchronizing torque that would be furnished by the four-pole windings 15 and 16 if the speed is assumed to be constant. This synchronizing torque oscillates and varies between plus and minus values as the angle of displacement between the rotating magnetic fields of windings 15 and 16 varies through 360 degrees. When the synchronizing torque is positive, pull in torque is available to bring the motor up to synchronous speed. When the synchronizing torque is negative, it is synchronous generator torque and it tends to lower the speed. Also, there is a third torque which is constant and which is negative and is designated IT 15 and 16. This is the sum of the negative induction motor torques furnished by windings 15 and 16. These windings 15 and 16 are connected together to the line such that the rotating magnetic field of one winding induces circulating currents in the other winding. The induction torques due to these conditions are negative because, when these windings are considered as the windings of an induction motor, such motor is operating far above synchronous speed with negative slip and the induction torque is induction generator torque or negative induction motor torque. The resultant of all of the various torques is plotted over that displacement angle in which we are most interested as R. T. and it is seen that, over a displacement angle of from about 120 to 220 degrees, the resultant torque is negative. The negative resultant torque area is shown shaded. It will be understood that the constant speed condition represented in Fig. 8 is impossible, unless the machine is held constant at such speed by external forces but the curves serve to show what would happen if the main four-pole windings 15 and 16 were connected to the line at such speed with various angles of displacement. If the four-pole windings 15 and 16 were connected to the line when the angle of displacement is less than about 120 degrees and the resultant torque positive, neglecting any mechanical load on the motor, the motor would pull into step as a double synchronous motor. If, however, the line switch to windings 15 and 16 were closed when the displacement angle is between about 120 and 220 degrees and the resultant torque is negative, the machine would immediately slow down to slightly below half speed where the torques IT 15 and 16 would become positive.

The curves of Fig. 9 represent the same conditions as in Fig. 8 with the exception that, in Fig. 9, it is assumed that the inductance 18 is connected in the synchronizing winding circuit as shown, for example, in Fig. 3. It is seen from Fig. 9 that, by including the inductance 18 in the main four-pole winding circuit, the synchronizing torque ST has been reduced. However, the sum of the negative induction motor torques of the four-pole windings 15 and 16 has been reduced in greater proportion to the value IT15 and 16, Fig. 9. The positive induction motor torque IT13 is unchanged. The resultant torque RT, Fig. 10, is always positive and, consequently, with light loads, the motor may be synchronized by including the inductance 18 when the line switch to windings 15 and 16 is closed at any angle of displacement.

It is seen that the pulling-into-step operation is greatly facilitated if the negative induction motor torque due to windings 15 and 16 is made small as compared to the synchronous torque due to these same windings at the time of synchronization. It can be shown by theoretical analysis and by test that this may be achieved by increasing the ratio of total leakage reactance to total resistance (primary plus secondary) of the circuit of windings 15 and 16. It is not practicable to reduce the resistance but it is practicable to increase the total leakage reactance by the use of the inductance 18 in series with and external to the motor. The average negative induction motor torque produced by the main four-pole windings 15 and 16 is approximately inversely proportional to the square of the total leakage reactance, while the synchronizing motor torque is approximately inversely proportional to the first power of the total leakage reactance. Hence, if the total leakage reactance is increased, leaving the resistance unchanged as far as possible, by the use of an inductance 18 which has small resistance, the negative induction motor torque is reduced in greater proportion than the positive synchronizing torque is reduced, thus reducing the total maximum torque only slightly.

It is, therefore, of considerable advantage in installations where the motor is not required to pull into step a heavy load to simplify the synchronizing operation by the temporary use of the external inductance 18. As soon as synchronism has been established, the external inductance is short-circuited by such arrangements as are shown in Figs. 6 or 7 and the double synchronous motor torque increased to its normal value for synchronous operation. Since the inductance 18 is in use only a few seconds, its size can be made small and its cost correspondingly low.

In cases where the motor is called upon to pull into step appreciable connected loads, a manual or automatic synchronizing scheme of conventional form for closing the main motor windings at a time when the displacement angle is favorable may be used. Fig. 10 represents one such semi-automatic scheme where only the main windings 15 and 16 of the motor have been shown. 24 represents a switch which is arranged to close the circuit to winding 16 automatically when winding 15 is energized and the motor is at a speed and displacement angle favorable to synchronism. Under these operating conditions, there will exist a pulsating voltage across the contacts of switch 24 corresponding to the slip speed, and such voltage is used to energize a quick-acting relay 25 when its circuit is closed by a push button 26. When relay 25 pulls up in response to a voltage pulsation across the contacts of switch 24, it energizes the operating coil 27 of switch 24 which then closes and, in closing, establishes its holding circuit through contactor 28. The speed of operation of the two relay devices 25 and 27 may be timed to close switch 24 at the instant when the displacement angle is favorable to a synchronizing action and, consequently, when the switch closes, the motor pulls into step. The push button 26 may then be released.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. An alternating-current dynamo-electric machine comprising stator and rotor elements, main polyphase primary windings of one pole number on said stator and rotor elements, a source of polyphase supply, means for connecting said main windings to said source with reverse phase rotation for operating said machine as a double-speed synchonous motor, a polyphase primary induction motor winding of one-half the pole number of said main primary windings on one element, an induction motor secondary therefor on the other element, means for connecting said primary induction motor winding to said source in delta for starting said machine as an induction motor and bringing it up to approximately the double synchronous operating speed afforded by said main windings, and means for connecting said primary induction motor winding in star to said source after double synchronous speed operation has been established, said induction motor primary and secondary then serving as a damper during synchronous operation to minimize the tendency of the machine to pull out of synchronism.

2. An alternating-current dynamo-electric machine comprising cooperating stator and rotor elements both having main polyphase primary windings of a given pole number, a source of polyphase supply, means for connecting said main windings to said source with reversed phase rotation for operation of said machine as a double-speed synchronous motor, a damper for reducing the tendency of said machine from falling out of step when operating at double synchronous speed comprising a polyphase induction motor utilizing said stator and rotor elements and including a polyphase primary winding on one of said elements and a secondary winding circuit therefor on the other of said elements, said induction motor having one-half the pole number of said main primary windings, and means for energizing said primary induction motor winding from said source for the purpose of starting said machine and bringing it up to approximately the double synchronous operating speed and also for energizing said induction motor primary winding from said source during double-speed synchronous operation with said main windings.

3. An alternating-current dynamo-electric machine comprisng cooperating stator and rotor elements, main polyphase primary windings of one pole number on both of said elements, an auxiliary polyphase primary winding of one-half the pole number of said main windings on one element, the main primary winding on the other element having circuits which serve as an induction motor secondary with respect to said auxiliary winding, a polyphase source of supply, means for connecting said main primary windings to said source with reversed phase rotation for the purpose of operating said machine as a double-speed synchronous motor, and means for connecting said auxiliary primary winding to said source for starting said machine as an induction motor and bringing it up to approximately the double synchronous speed afforded by said main windings and for energizing said auxiliary winding from said source during such double synchronous speed operation, whereby induction motor action becomes available as damping action when there is any tendency for the machine to depart from double synchronous speed.

4. An alternating-current dynamo-electric machine comprising cooperating stator and rotor elements, main primary polyphase windings on both of said elements, an auxiliary polyphase induction motor primary winding of one-half the pole number of the main winding on the stator element, the main primary winding on the rotor element having circuits which serve for a secondary induction motor winding of the same pole number as said auxiliary primary winding, a polyphase source of supply, means for supplying said auxiliary primary winding from said source for starting said machine as an induction motor, means for connecting said main primary windings to said source in reversed phase rotation for operating said machine as a double-speed synchronous motor, said connection being made after the machine has been brought up to approximately such speed as an induction motor, means for synchronizing said machine as a double-speed synchronous motor, and means for reducing the excitation of said auxiliary primary winding after such synchronizing operation, the induction motor windings remaining energized at reduced excitation during synchronous operation.

5. An alternating-current dynamo-electric machine having cooperating stator and rotor elements with main polyphase primary windings on both elements and with polyphase primary and secondary induction motor winding circuits of one-half the pole number of the main windings on stator and rotor elements, respectively, a polyphase source of supply, means for energizing said auxiliary primary winding from said source to start said machine as an induction motor and bring it up to no-load induction motor speed with small slip, means for then connecting the main primary windings to said source with reversed phase rotation, an inductance external to said machine which is included in circuit with at least one of said main primary windings when they are first connected to said source for temporarily increasing the leakage reactance of the main primary winding motor circuit to permit establishing synchronization between their rotating magnetic fields at any displacement angle between such fields, and means for cutting said inductance out of circuit after synchronism has been established, said induction motor winding circuits remaining energized during synchronous operation and serving as a damper to minimize the tendency of said machine to pull out of synchronism.

6. The method of starting and synchronizing a double-speed synchronous motor having main polyphase primary windings on stator and rotor and polyphase primary and secondary induction motor winding circuits on stator and rotor of one-half the pole number of the main windings which consists in starting said machine and bringing it up to approximately double synchronous speed as an induction motor by first energizing said primary induction motor winding circuit from a polyphase source, then, while operating as an induction motor, energizing said main primary windings with reversed phase rotation from said source through a circuit which abnormally increases the leakage reactance of the main primary winding motor circuit to the extent necessary to cause said motor to pull into synchronism at any angle of displacement between the rotating magnetic fields of said main primary windings, and then, after synchronism has been established, reducing the leakage reactance of the main primary winding motor circuit to normal.

7. The method of starting and operating a double-speed synchronous motor having main primary synchronous motor windings on stator and rotor and primary and secondary induction motor winding circuits of one-half the pole number of the main windings on stator and rotor, respectively, which consists in using a common source of alternating-current supply for all primary windings of said motor, energizing the primary induction motor winding circuit from said source to start said motor and bring it up to slightly below synchronous speed as an induction motor, next energizing the main primary windings with reversed phase rotation through an inductive circuit that increases the leakage reactance of the main primary motor winding circuit above normal and to the extent necessary to cause the rotating magnetic fields of said primary windings to pull the motor into synchronism from any displacement angle between such fields, next, after synchronism has been established, reducing the leakage reactance of the main primary winding motor circuit to normal and then operating as a double-speed synchronous motor with the primary induction motor winding energized from said source.

8. The method of starting and operating double speed synchronous motors having main primary windings on stator and rotor and primary and secondary induction motor winding circuits of one-half the pole number of the main primary windings on stator and rotor, respectively, which consists in starting said motor and bringing it up to approximately synchronous speed as an induction motor by energizing said primary induction motor winding from an alternating-current supply, next, while said machine is operating as an induction motor with low slip, energizing the main primary windings with reversed phase rotation from the same supply, next, while said primary induction motor circuit remains energized, establishing synchronism between the reversely rotating magnetic fields of said main primary windings, and then operating as a double-speed synchronous motor while the primary induction motor circuit is energized.

GUSTAVE ANGST.